June 26, 1928.                     1,675,216
H. HEIMBERGER
ENDOSCOPE
Filed June 18, 1927
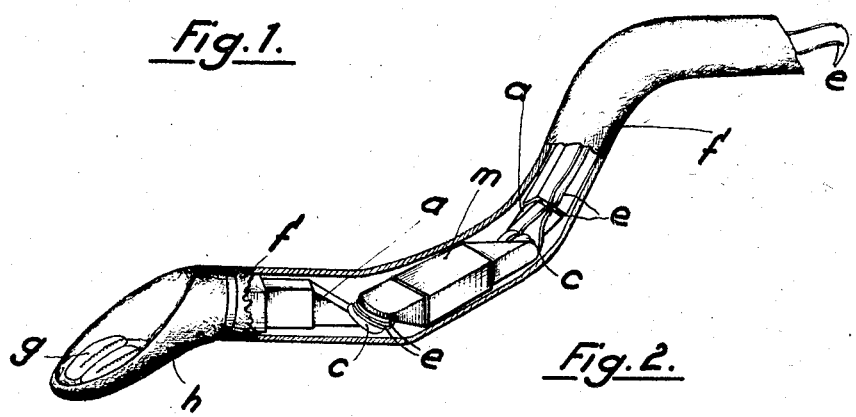
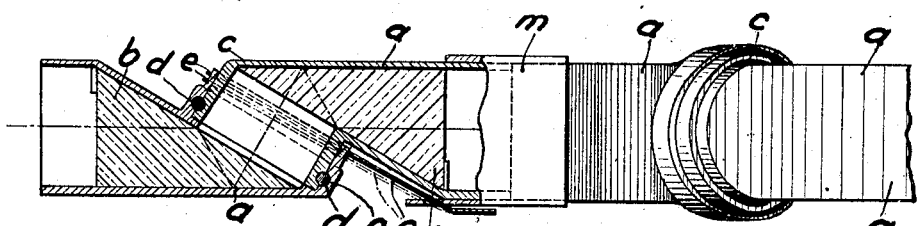
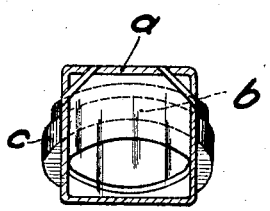
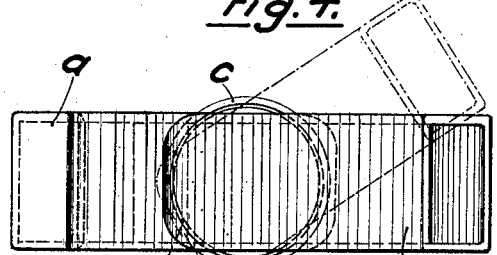
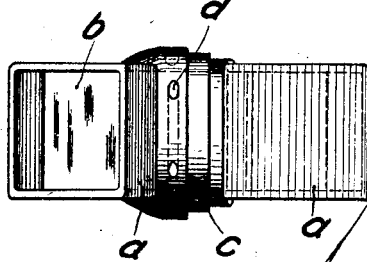
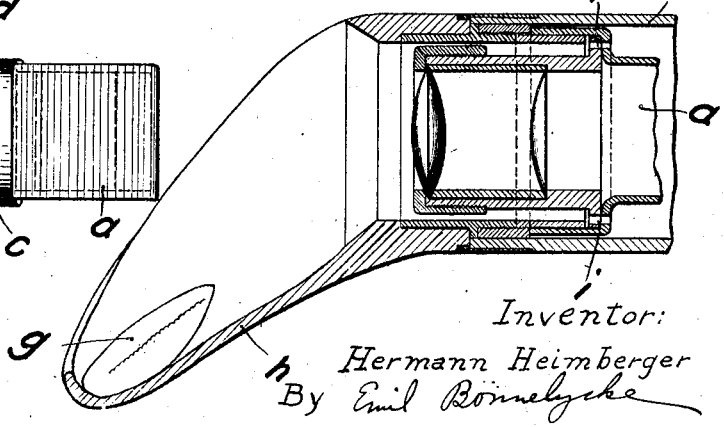
Inventor:
Hermann Heimberger
By Emil Bonnelycke
Attorney Patented June 26, 1928.

1,675,216

UNITED STATES PATENT OFFICE.

HERMANN HEIMBERGER, OF TUBINGEN, GERMANY.

ENDOSCOPE.

Application filed June 18, 1927, Serial No. 199,795, and in Germany November 9, 1925.

Endoscopes used for the interior observation of an organ or a hollow body have certain disadvantages more particularly in consequence of their rigid form which detracts from their use in many cases. Frequently the introduction is rendered difficult on account of natural obstacles and it is quite impossible to introduce rigid telescopes without damage. Such instruments are still less suitable for the observation of a tortuous, tubular or multi-chambered hollow space when the passage through which the instrument is to be introduced exceeds a certain length.

The disadvantages of such instruments having a straight rigid optical system as well as telescopes hitherto known for this purpose which have a plurality of joints and mirror surfaces in the interior prevented their extensive use and besides are excluded from such use on account of the influence of the size of the field of vision.

The invention relates to an endoscopic instrument which can be introduced through a long and tortuous passage whilst being under constant control of the eye and which allows of the observation of hollow spaces of miscellaneous forms. For this purpose the optical system is split up into a number of optical individual members which can be rotated away from the eye piece at inclinations opposed to one another so that the instrument can be considered as flexible or bendable within certain limits.

In order that the invention may be clearly understood reference is made to the accompanying drawing which shows diagrammatically and by way of example a constructional form in accordance with the present invention.

Figure 1 is a pictorial representation of an endoscope in accordance with the present invention, parts being broken away for convenience of description and illustration.

Figure 2 is a view partly in section of one of the members forming the endoscope.

Figure 3 is a cross section on the line A, A Figure 2.

Figure 4 is a plan view of two of the members.

Figure 5 is a side view of the joint support.

Figure 6 is an axial section through the head piece of the instrument.

The optical system of the instrument in accordance with the present invention is split up into several members which are connected by suitable joints within one another. The members comprise the intermediate piece $m$ in which lenses, not shown, are disposed and two end pieces $a$ formed separately which are connected with one another by the intermediate piece.

In the end pieces $a$ of all the members are disposed equal right angle prisms $b$ and $b'$ whose long cathetal surfaces are silvered for the purpose of obtaining reflection of the light. They are so disposed that the hypotenuse surfaces of two adjacent prisms lying parallel to one another are turned toward one another and are rotated through an angle of 180°.

The members are connected with one another in such manner that they are rotatable about an axis normal to the hypotenuse surface. For this purpose the end pieces $a$ at the ends fit into short supports $c$, these parts exactly fitting in one another as well as being mutually rotatable. In order to prevent separation of these two parts in the axial direction circular grooves are provided in both supports $c$ in which pins $d$ engage.

The prisms $b$ and $b'$ serve to deflect the light rays out of the tubular axis of the member through a certain angle and they are so mutually rotatable that the rays issuing from the final prism of each member are again deflected by the front prism of the next member to the tubular axis. They are incident after passing through this member on the closing or final prism thereof and are reflected thereby onto the next backwards front prism and so on. The central ray of the optical system is therefore between the hypotenuse surfaces of the final or closing and front prism of each member at an angle to the tubular axis which angle can be exactly calculated. As it is however perpendicular to the hypotenuse surfaces of the prisms a mutual rotation of the member or members about this central ray as an ideal axis causes no alteration in the optical relation. The path of the central ray is shown in Figure 2.

The rotation of the several members can be effected by means of pulling cords $e$. The pulling cords are arranged in pairs and there may be any suitable number thereof. They are fixed in front about the joint-supports of the members to be moved and twisted or rotated as shown in Figure 2, and then pass through guides in the succeeding members to the eye-piece of the instrument. By pulling one cord or the other a rotation of the member is thus produced, that is to say flexure or bending of parts of the instrument in both directions of rotation is rendered possible. A tensioning device controls the variable length of the several pulling cords and compensates therefor. By simultaneous pulling and fixing of the pulling means the conversion of the instrument into an approximately rigid bar is obtained.

A rubber sheath or sleeve $f$ can be loosely disposed over the members. In the hollow space still existing air can be blown through which escapes by a separate opening $i$ in the head piece of the instrument Figure 6, which carries an incandescible electric lamp in a protecting cap.

What I claim is:—

1. An endoscope with interrupted optical axis characterized in that a number of right angle prisms are disposed between the objective and the eye-piece whose hypotenuse surfaces are parallel to one another and are mutually rotatable about an axis normal to the hypotenuse surfaces and that the axial light ray incident axially on the cathetus of the one prism is reflected from the second cathetus of the said prism and issues therefrom into the adjacent prism and there undergoes similar reflection into an axial direction.

2. An endoscope according to claim 1, characterized in that the members of each pair of prisms can be moved independently of one another by means of flexible members towards the desired side of the eye-piece.

3. An endoscope with interrupted optical axis comprising a plurality of right angle prisms disposed between the objective and an eyepiece whose hypotenuse surfaces are parallel to one another and are mutually rotatable about an axis normal to the hypotenuse surfaces.

4. An endoscope with interrupted optical axis comprising a plurality of right angle prisms disposed between the objective and an eyepiece whose surfaces are parallel to one another and the axial light ray incident axially on the cathetus of one prism is reflected from the second cathetus of the said prism and issues therefrom into the adjacent prism and there undergoes similar reflection into an axial direction.

In testimony whereof I affix my signature.

H. HEIMBERGER.